United States Patent [19]
Mandel et al.

[11] Patent Number: 4,770,715
[45] Date of Patent: Sep. 13, 1988

[54] NOVEL COMPOSITIONS AND METHOD FOR CONTROL AND CLEAN-UP OF HAZARDOUS ORGANIC SPILLS

[75] Inventors: Frederick S. Mandel; James A. Engman, both of Marinette, Wis.; Wayne R. Whiting, Oconto, Wis.; James F. Nicol, Plano, Tex.

[73] Assignee: Wormald, U.S., Inc., Dallas, Tex.

[21] Appl. No.: 859,121

[22] Filed: May 2, 1986

[51] Int. Cl.$^4$ .......................... B01J 13/00; B08B 7/00
[52] U.S. Cl. ...................... 134/40; 210/680; 210/925; 252/315.2
[58] Field of Search ............... 210/680, 925; 44/7.1; 252/315.2; 134/40

[56] References Cited

U.S. PATENT DOCUMENTS

| | | | |
|---|---|---|---|
| 3,090,749 | 5/1963 | Warnock | 252/2 |
| 3,562,153 | 2/1971 | Tully et al. | 210/680 |
| 3,676,357 | 7/1972 | Ciuti et al. | 252/323 X |
| 3,798,158 | 3/1974 | Bunn | 210/925 X |
| 3,821,109 | 6/1974 | Gilchrist et al. | 210/925 X |
| 3,831,760 | 8/1974 | Economy et al. | 210/242.4 |
| 4,137,162 | 1/1979 | Mohri et al. | 210/680 X |
| 4,206,080 | 6/1980 | Sato et al. | 210/925 X |
| 4,230,568 | 10/1980 | Chappell | 210/751 |
| 4,238,334 | 12/1980 | Halbfoster | 210/679 |

FOREIGN PATENT DOCUMENTS 1517628 12/1972 Fed. Rep. of Germany ...... 210/680
2151912A 7/1985 United Kingdom .

Primary Examiner—Richard D. Lovering
Attorney, Agent, or Firm—Morgan & Finnegan

[57] ABSTRACT

This invention relates to novel compositions and methods for control and clean-up of hazardous organic spills. A dry particulate composition of activated carbon and, alternatively, absorptive materials may be used to control and contain organic spills, solidify the spills and elevate their flashpoints to render them harmless. These compositions may be applied to the spills by fire-extinguisher like delivery devices which spread the compositions and the spills from a relatively safe distance without splattering the hazardous material.

4 Claims, No Drawings

NOVEL COMPOSITIONS AND METHOD FOR CONTROL AND CLEAN-UP OF HAZARDOUS ORGANIC SPILLS

BACKGROUND OF THE INVENTION

1. Field of the Invention

This invention relates to novel compositions and the novel methods of their use for neutralization and clean-up of hazardous organic spills.

2. Prior Art

Various compositions have been known in the past to be useful for the clean-up of hazardous organic waste materials. However, these prior art compositions and methods are not easily applicable to use in most organic spill situations. One major problem caused by organic spills is the risk of explosion due to the volatilization of the organics. These materials have low flashpoints and are readily explosive.

U.S. Pat. No. 3,831,760 (Economy et al.) describes an activated carbon textile which may be used for absorbing toxic liquid spills, such as crude petroleum, phenol, and other suspensions of gaseous chemicals from the surface of a body of water. According to the patent, an activated carbon chemical adsorption assembly composed of (1) a longitudinal buoyant member, (2) a flexible fabric of activated carbon textile with one edge connected to said member to be floatingly supported thereby, and (3) weight (sinking) means connected to an opposite edge of the activated carbon textile to maintain the edge spaced apart from the buoyant member is used to collect the spill and absorb it from the surface of water. This method cannot be used on solid land.

U.S. Pat. No. 4,238,334 (Halbfoster) relates to a method for using a filter bed for removing impurities from liquids. The filter bed is composed of a mixture of treated filter material and an active particulate material. The treated filter material and active particulate material have opposite surface charges in aqueous suspension. The filter bed is layer on which has been or shallow bed. The filter bed generally has activated carbon in it, and the filter aid materials are fibrous and elongated. The filter aid materials can be cellulose, polyacrylonitrile, Teflon, nylon, rayon, polypropylene or polyvinylchloride. This method entails elution through a bed, and is inapplicable to situations in which a spill has occured.

U.S. Pat. No. 4,230,568 (Chappell) describes a process for treating organically contaminated liquid hazardous wastes. According to the patent, liquid wastes are treated by exposing the liquid hazardous waste to a calcium-containing cement and an aluminum silicate or an alumino-silicate, forming a slurry and allowing the slurry to set into a rigid rock-like mass. To the slurry is added a sufficient amount of activated carbon to reduce to an acceptable level the leaching of waste from the rock-like mass. For example, activated carbon and portland cement can be added to an organic liquid hazardous waste in accordance with the processes of this invention. This method does not prevent the evaporation of volatile organic gases, which can cause an explosion.

Great Britain Published Application No. 2,151,912A describes an article for cleaning up spilled liquids which is composed of a bag, pillow or sack. The sack is charged with absorbent material and sealed by glueing. The absorbent material can be a particulate such as perlite or another mineral material like ball clay, fullers earth, bentonite, or vermiculite. This method merely absorbs the organics without reducing volatilization or elevating the flashpoint.

U.S. Pat. No. 4,326,846 (Shibata) relates to a porous adsorbent material for oils and fats made of silica and clay. The organics merely absorb and desorb from this material without being rendered less hazardous or being removed from the environment.

SUMMARY OF THE INVENTION

This invention is directed to novel compositions and methods of using the compositions to absorb and chemically adsorb hazardous organic spills so as to render harmless the spill and so as to lower the flashpoint of the organic materials in the hazardous spill.

The novel compositions of this invention are composed of the following: about 50 to 100% activated carbon having a $50 \times 200$ size distribution and a working capacity of about 1500 $m^2$/gram, about 0 to 10% absorbent magnesium oxide or organophyllic clay, about 0 to 50% hydrophobic polymer having molecular weight between about 5,000 and 30,000, about 0 to 10% alumina or silica, and about 0 to 5% magnesium silicate.

The novel compositions of this invention may be made by combining and mixing in a blender. The novel compositions of this invention may be applied to a hazardous organic spill through a delivery device similar to a fire extinguisher. The compositions are in the form of small particles having a predominant size distribution in the range between $-40$ to $+200$ Tyler screen mesh range.

The compositions may be stored under pressure in a cannister or in an unpressurized vessel. They are preferably delivered on a nitrogen gas stream propellant. The nozzle of the fire extinguisher-like delivering device is modified so that a soft delivery pattern is attained at a distance of between 10 and 15 feet. The nozzle velocity is between 30 and 50 ft/sec.

The mode of application of the method of this invention allows the control of hazardous spills from a distance without causing splashing of the hazardous materials during clean-up and hence avoids danger to the handler.

DETAILED DESCRIPTION OF PREFERRED EMBODIMENTS

The compositions of this invention act to control hazardous organic spills by, for example, reducing the rates of evaporation of the organic components of the spill, elevating the flashpoints of the organic components of the spill and adsorbing the hazardous spill components.

The activated carbon component of the compositions of this invention acts to adsorb the organic spill components. The activated carbon used should have a high pore volume to surface area ratio so as to allow it to adsorb a proportionately large quantity of organic chemical.

The activated carbon preferably used in the compositions of this invention should have a working capacity of about 1500 $m^2$/gram of activated carbon. The activated carbon particles should have a size distribution of about $50 \times 200$, i.e. the particles pass through a 50-mesh screen but not a 200-mesh screen. Preferably 60% of the particles should pass through a 60-mesh screen and not through a 100 mesh screen (standard Tyler mesh srceen).

The adsorption of the organics aids in elevating the flashpoint of the spill. A large risk involved in hazardous organic spills is the possibility of explosion. Explosions are primarily caused by the vaporization of the volatile organic chemicals in the spill. When the vapors reach a critical vapor pressure, they may cause an explosion. The adsorption of the organics in liquid form substantially slows their volatilization and thereby slows the increase in their vapor pressure. This causes an elevation in the flashpoint and minimizes the risk of explosion.

Once the organics are adsorbed, they solidify almost instantaneously and can be cleaned up without danger to the handler.

The activated carbon may be coated with a hydrophobic polymer such as polyacrylic acid, which may compose up to 50% by weight of the entire composition. The polyacrylic acid has a hydrophobic backbone and enhances the ability of the activated carbon to attract and adsorb the organic materials, which are also hydrophobic. These polymers function to attract and drive the organics into the pore structure. Of course, other polymers having a hydrophobic backbone, preferably having a molecular weight of between about 5,000 and about 30,000, may be used to enhance the adsorptive qualities of the activated carbon. However, they should not be so large as to clog the pores prior to using the activated carbon. Another polymer, poly(vinyl sulfonate) sodium salt may also preferably be used in this function. These polymers are applied wet to the activated carbon prior to use and the carbon allowed to dry. The enhanced activated carbon is then ready for use in treating organic spills.

Other components may optionally be added to the compositions of this invention. For example, about 0–30% (by weight) of absorbent clay or magnesium oxide, e.g. portland cement may be added to the compositions. Portland cement acts to absorb the hazardous organics and solidify the spill. Highly-absorbent organophyllic clay may also be used for this purpose.

Bentonites and other organophyllic clays, such as attapulgites and kaolin, may be used in the amount of between about 0 and about 10% by weight to aid in absorbing the organic spill and in solidifying the spill. Absorption assists in containing the spill and preventing its further spread. These clays may be less absorbent than those used in place of or in addition to the magnesium oxide or organophyllic clays. This aids in allowing a controlled absorption of hazardous organics by variation of absorption rate. As certain portions of the spill are absorbed, others desorb and react.

About 0–10% by weight of alumina or silica may be used in the composition to aid in slowing the rate of elution of the hazardous spill through the treatment composition. By slowing the elution rate, the alumina allows the activated carbon more time to adsorb the spill. The alumina, glass microspheres of sintered glass, serves to create as much active surface area in the treatment composition as possible.

Magnesium silicate may be used to serve as a molecular attractant. It may be used in the amount of between about 0 and 5% by weight of the composition. Magnesium silicate serves to bind ketones and, for example, acetones by Van der Waals forces, which strongly bind these molecules and render them less hazardous.

Fumed silicas, silica gel and silica may also be used in minor amounts (between about 0 and 10%) to aid in adsorption. The elements of the composition which aid in adsorption also contribute to the elevation of the flashpoint of the hazardous spill.

One preferable composition is composed of 100% activated carbon. Another preferable composition is composed of 60% activated carbon, 30% portland cement, 5% organophyllic bentonite, 2% absorption grade alumina, 2% silica gel and 1% poly (acrylic acid). This composition can elevate the flashpoint of gasoline from $-45°$ F. to about 95° F.

When applied to gasolines and other liquid hazardous spills, the compositions of this invention adsorb and solidify the spills almost instantaneously. More viscous or dense compositions and compositions having high flashpoints may require a longer period to solidify or be rendered harmless.

Preferably, the composition should be applied to the spill in layers: one, which serves to adsorb the spill and one or more other layers, which serve to elevate the flashpoint. The initial layer serves to contain the liquid spill and prevent it from spreading. Another layer aids in reducing the rate of evaporation and hence elevates the flashpoint. The solidified material may then be safely handled and cleaned up. Preferably the material may be placed in a barrel, in which another layer may be applied so as to elevate the flashpoint even more.

The compositions of this invention are preferably applied to the hazardous spills from a fire-extinguisher-like vessel. They are preferably applied in the dry form in which they are stored. They may be stored under pressure until used in a stored pressure vessel or they may be stored in an unpressurized vessel and pressurized by external gas through an external expellent gas cartridge.

The size distribution of the particles of the compositions of this invention allows them to be applied to spills in a 'soft' pattern, i.e. relatively spread out such that they cover a spill as it spreads without splattering the spill. The compositions should be applied from a distance of about 10 to 15 feet. The nozzle velocity should be between about 30 and 50 feet/second. In order to achieve this velocity, the particles should have a size distribution between $-40$ and $+200$ Tyler screen mesh size.

The particulate compositions of this invention may be applied on a nitrogen gas stream. The particular specified size distribution will substantially assure the appropriate flow rate and delivery pattern.

These compositions may be used to control a vast variety of organic spills including benzene and the like as well as higher-molecular weight and more complex materials such as gasoline and oils and the like.

What is claimed is:

1. A method of absorbing and elevating the flashpoint of hazardous organic spills comprising discharging onto said spill a sufficient amount of a composition comprising about 50 to 100% activated carbon having a $50 \times 200$ size distribution and a working capacity of about 1500 m/g, about 0 to 30% absorbent magnesium oxide or organophyllic clay, 0 to 50% hydrophobic polymer having molecular weight between about 5,000 and about 30,000, 0 to 10% alumina or silica, and 0 to 5% magnesium silicate such that said spill is absorbed and its flashpoint is elevated.

2. A method according to claim 1 wherein said composition is dispensed under pressure.

3. A method according to claim 1 wherein said application is accomplished by delivering said composition to said spill under pressure on a nitrogen gas propellent from a fire-extinguisher-like delivery device such that said composition falls in a soft delivery pattern.

4. A composition for absorbing and elevating the flashpoint of hazardous organic spills which are capable of being dispensed under pressure comprising about 60% activated carbon, 30% portland cement, 5% organophyllic bentonite, 2% silica gel and 1% poly (acrylic acid).

* * * * *